(No Model.)

J. POET, Dec'd.
A. C. RICE, Administrator.
PLUMB LEVEL.

No. 453,794. Patented June 9, 1891.

Witnesses.
Arthur Ashley
Geo. A. Byington

Inventor
John Poet
per Hallock & Hallock
attys.

UNITED STATES PATENT OFFICE.

JOHN POET, OF ANDERSON, INDIANA, ASSIGNOR OF ONE-HALF TO LEANDER C. MITCHELL, OF SAME PLACE; A. C. RICE ADMINISTRATOR OF SAID JOHN POET, DECEASED.

PLUMB-LEVEL.

SPECIFICATION forming part of Letters Patent No. 453,794, dated June 9, 1891.

Application filed March 29, 1890. Serial No. 345,857. (No model.)

*To all whom it may concern:*

Be it known that I, JOHN POET, a citizen of the United States, residing at Anderson, in the county of Madison and State of Indiana, have invented certain new and useful Improvements in Levels; and I do hereby declare the following to be a full, clear, and exact description of the invention, such as will enable others skilled in the art to which it appertains to make and use the same.

My invention relates to that class of levels which are provided with a bob carrying a pointer that projects through the center of the dial-plate.

The object of my invention is to improve upon the general construction of this form of device; and to that end the nature of the invention consists of constructions and combinations, all as will hereinafter be described in the specification and pointed out in the claims, reference being had to the accompanying drawings, in which—

Figure 1:
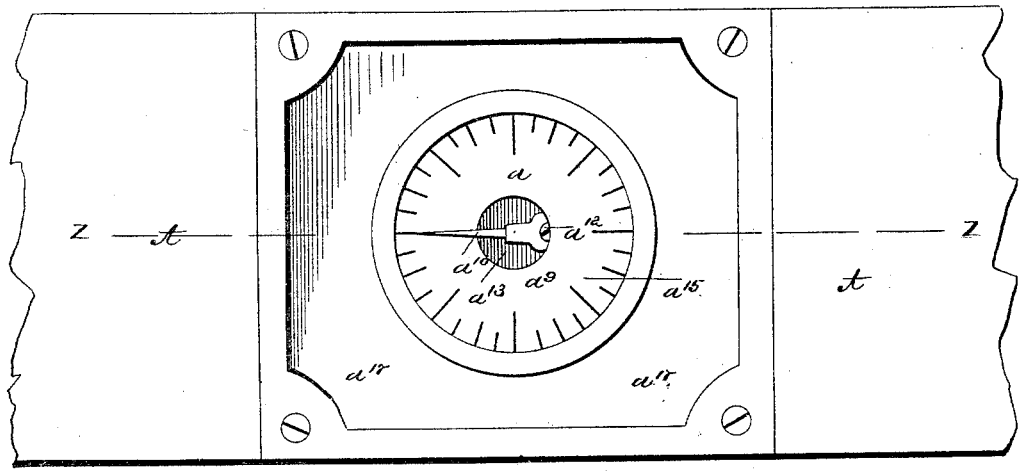
Figure 2:
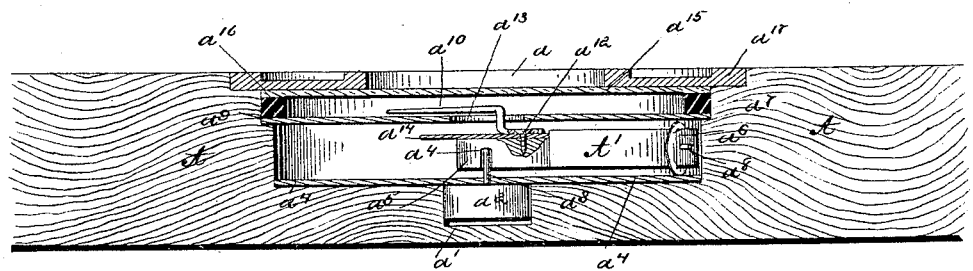
Figure 3:
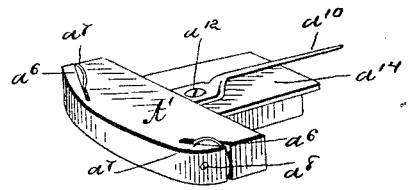

Figure 1 represents a front elevation of my level; Fig. 2, a section on line 2 2 of Fig. 1, and Fig. 3 a perspective of the bob and the parts attached thereto.

A represents the body of the level, of rectangular form, the sides being at exact right angles to the ends and the ends at exact right angles to the sides, so that the level can be used by resting it upon the sides or standing it upon its ends. In the face of the body is an opening $a$, of circular shape and having at its back an opening or recess $a'$, in which is inserted a hub $a^2$, carrying a pin $a^3$, and which is held in place by a plate $a^4$, secured in the opening $a$ in any desired manner, preferably by means of glazier's brads. Upon pin $a^3$ the bob A' is hung in any suitable manner, preferably by forming an opening $a^4$ in the cheek $a^5$ of the bob. The body of the bob A' is flat-sided and round-ended. At each end is formed a slit $a^6$, for the anti-friction wheels $a^7$, which are held in place by the pins $a^8$. These wheels project beyond the sides of the bob and contact with the plate $a^4$ and the inside of the dial-plate $a^9$, and prevent the bob and pointer from moving in a line at right angles to the plane of oscillation of the bob when the level is moved in different positions, and also prevents the bob from sagging when the level is laid upon its back or face, and thus cause the pointer to be bent out of its proper shape. The pointer $a^{10}$ is secured to the cheek $a^5$ by means of a screw $a^{12}$, and is bent upon itself to project through the opening $a^{13}$ in the dial-plate $a^9$.

If desired, a plate $a^{14}$ may be secured to the bob, as shown, to conceal the inside of the level, or rather that part which would be exposed through opening $a^{13}$.

The dial-plate is covered with glass $a^{15}$, having a rubber packing $a^{16}$ between it and the dial-plate, and which serves as a cushion for the latter when the bob is moved. The glass is held in place by a plate $a^{17}$, secured to the body A.

If desired, the anti-friction wheels may be attached to the bottom of the bob instead of in the manner shown.

What I claim as new is—

1. In a level, the combination of the swinging bob having a pointer and anti-friction wheels, the dial-plate, and the plate in the rear of the bob, which plates form guides for the anti-friction wheels and prevent the movement of the bob at right angles to the plane of oscillation, substantially as described.

2. In a level, the combination of a swinging bob having the anti-friction wheels, the plate in the rear of the bob, the dial-plate having the central opening and forming with the plate in the rear of the bob guides for the anti-friction wheels, and a pointer secured to the bob and projecting through said opening, substantially as described.

3. In a level, the combination of the hub $a^2$, having pin $a^3$, plate $a^4$, secured to the body of the level and holding hub and pin in place, the dial-plate, and the swinging hub pivoted upon said pin and having anti-friction wheels in contact with said plate $a^4$ and dial-plate, substantially as described.

In testimony whereof I affix my signature in presence of two witnesses.

JOHN POET.

Witnesses:
 CONRAD NEAL,
 L. C. MITCHELL.